(12) United States Patent
Namiki

(10) Patent No.: US 10,430,650 B2
(45) Date of Patent: Oct. 1, 2019

(54) IMAGE PROCESSING SYSTEM

(71) Applicant: FANUC CORPORATION, Minamitsuru-gun, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/971,063

(22) Filed: May 4, 2018

(65) Prior Publication Data
US 2018/0336407 A1 Nov. 22, 2018

(30) Foreign Application Priority Data

May 18, 2017 (JP) .................................. 2017-098865

(51) Int. Cl.
*G06K 9/46* (2006.01)
*G06K 9/00* (2006.01)
(Continued)

(52) U.S. Cl.
CPC .......... *G06K 9/00523* (2013.01); *G06K 9/20* (2013.01); *G06K 9/4604* (2013.01); *G06K 9/6255* (2013.01); *G06N 3/08* (2013.01); *G06N 20/00* (2019.01); *G06T 15/205* (2013.01); *H04N 5/23229* (2013.01)

(58) Field of Classification Search
None
See application file for complete search history.

(56) References Cited

U.S. PATENT DOCUMENTS

| 2009/0319451 | A1* | 12/2009 | Mirbach | G06K 9/6262 706/12 |
| 2017/0364733 | A1* | 12/2017 | Estrada | G06N 3/08 |
| 2018/0253866 | A1* | 9/2018 | Jain | G06K 9/628 |

FOREIGN PATENT DOCUMENTS

| CN | 106355188 | 1/2017 |
| JP | 2000-215319 | 8/2000 |

(Continued)

OTHER PUBLICATIONS

David A. Forsyth et al., "Computer Vision: A Modern Approach, Chapter 8: Edge Detection", Jan. 2007 (with English translation).
(Continued)

*Primary Examiner* — Stephen P Coleman
(74) *Attorney, Agent, or Firm* — Wenderoth, Lind & Ponack, L.L.P.

(57) ABSTRACT

An image processing system comprises: a model pattern acquisition unit that acquires a model pattern generated from input shape information; a model pattern correction unit used for correcting the model pattern acquired by the model pattern acquisition unit; and a machine learning unit that generates model pattern generation information for generating the model pattern from the input shape information by performing supervised learning using a set of learning data pieces each including correction information about the model pattern corrected by using the model pattern correction unit and the input shape information associated with each other. The image processing system is capable of generating a model pattern in which a result of the learning is reflected using the input shape information newly input and the model pattern generation information.

10 Claims, 13 Drawing Sheets

(51) Int. Cl.
*G06N 20/00* (2019.01)
*G06K 9/20* (2006.01)
*G06N 3/08* (2006.01)
*G06T 15/20* (2011.01)
*H04N 5/232* (2006.01)
*G06K 9/62* (2006.01)

(56) References Cited

FOREIGN PATENT DOCUMENTS

| JP | 2011-209966 | 10/2011 |
|---|---|---|
| JP | 2014-137756 | 7/2014 |
| JP | 2015-41164 | 3/2015 |
| JP | 2015-94973 | 5/2015 |
| JP | 2016-6616 | 1/2016 |
| JP | 2016-62524 | 4/2016 |

OTHER PUBLICATIONS

David G. Lowe, "Object Recognition from Local Scale-Invariant Features", Proc. of the International Conference on Computer Vision, Corfu, Sep. 1999.
Office Action dated Aug. 1, 2019 in corresponding Chinese Application No. 201810464105.0.

\* cited by examiner

IMAGE PROCESSING SYSTEM

This application is based on and claims the benefit of priority from Japanese Patent Application No. 2017-098865, filed on 18 May 2017, the content of which is incorporated herein by reference.

BACKGROUND OF THE INVENTION

Field of the Invention

The present invention relates to an image processing system that detects an image of a target in input shape information based on a model pattern representing the feature of the image of the target.

Related Art

According to a technique conventionally known for detecting an image of a target in input shape information (input image) acquired by an image capture device, for example, matching is performed between standard information such as a model pattern generated by making a model of an image of the target or a template and the input shape information. If a level of the matching exceeds a predetermined level, the target is determined to be detected. Patent documents 1 to 3 describe related techniques.

Patent document 1 describes an image processing technique of separating a foreground image and a background image by learning a region except a mask region in an input image as the background image. Patent document 2 describes a technique of correcting the position of a representative point forming a template model generated by a user by performing matching between the template model and a feature quantity extracted from an input image. Patent document 3 describes a technique for detecting a target object in an image. According to this technique, a parameter optimum for image processing to be performed on an input image and a learning image is searched for. Based on this parameter, the image processing is performed on the learning image and the input image.

Non-patent document 1 describes a method of extracting an edge point from an input image as a feature point forming a model pattern. An edge point is a point where brightness changes largely in an image. Generally, an image of the contour of a target has large brightness gradient. Thus, matching of the contour shape of the target is performed using an edge point as a feature quantity. For example, an edge point group extracted from an image including a target to be detected is stored as a model pattern. The target is detected based on a level of matching between an edge point group extracted from an input image acquired by an image capture device and the edge point group as the model pattern. The technique of this type is known to use the generalized Hough transform. Non-patent document 2 discloses a method of extracting an element forming a model pattern other than an edge point. Non-patent document 2 describes a method of extracting an SIFT feature point from an input image.

Patent Document 1: Japanese Unexamined Patent Application, Publication No. 2011-209966
Patent Document 2: Japanese Unexamined Patent Application, Publication No. 2000-215319
Patent Document 3: Japanese Unexamined Patent Application, Publication No. 2014-137756
Non-Patent Document 1: "Computer Vision," written by David A. Forsyth and Jean Ponce, translated by Tsuyoshi Ohkita, published by Kyortsu Shuppan Co., Ltd., 2007. 1
Non-Patent Document 2: "Object Recognition from Local Scale-Invariant Features", David G. Lowe, Proc. of the international Conference on Computer Vision, Corfu (September 1999)

SUMMARY OF THE INVENTION

In some cases, a model pattern generated from an input image does not represent the feature of a target appropriately. In many cases, Al addition to an edge point appropriate for detection such as a contour, the input image includes an edge point inappropriate for detection such as contrast other than a contour, for example. Hence, a portion not to be detected is inadvertently detected simultaneously with generation of the model pattern from the input image. In the case of detection of a casting part, a casting surface has an individual difference in its contour. Further, in many cases, the texture of the casting surface is also extracted as an edge point. Thus, detecting the contour of a portion processed by a machine is more preferable in terms of matching accuracy.

Such an element inappropriate for detection can be eliminated from a model pattern by operation by a user. For example, a particular place in a model pattern generated from an input image may be masked and an element within this mask may be excluded from an element forming the model pattern. In addition to deleting an element forming the model pattern, a new element can be added to the model pattern. Further, the position of an existing element can be changed. However, correcting the model pattern by hand is complicated operation for a user. Further, correcting the model pattern to a favorable model pattern available for matching requires knowledge. Thus, an optimum model pattern is desirably generated automatically from an input image by learning.

In this regard, according to the technique of patent document 1, a user designates the position of a human to learn separation between a foreground image and a background image. However, a method of generating a model pattern is not learned. According to the method of patent document 2, while the position of a feature point forming a model pattern is corrected automatically, an element used for determining whether or not the feature point has been corrected to a proper position is not contained in the model pattern. The learning described in patent document 3 is operation for generating a dictionary for detecting a target. Hence, the foregoing correction to be made in response to an inappropriate element forming a model pattern is not reflected in this learning. As described above, the conventional techniques are not available for reflecting correction made during generation of a model pattern to be used for matching and are not intended to learn a method of generating a model pattern.

The present invention is intended to provide an image processing system capable of generating an appropriate model pattern automatically for input shape information by learning correction made during generation of a model pattern acquired from different input shape information.

(1) The present invention relates to an image processing system (image processing system 1, 201, 301 described later, for example) that detects an image of a target (target 2 described later, for example) in input shape information (input image 5, CAD data, three-dimensional point group data described later, for example) based on a model pattern (model pattern 50 described later, for example) representing the feature of the image of the target, comprising: a model pattern acquisition unit (model pattern acquisition unit 31 described later, for example) that acquires the model pattern generated from the input shape information; a model pattern correction unit (operator's panel 35 described later, for example) used for correcting the model pattern acquired by the model pattern acquisition unit; and a machine learning unit (machine learning unit 40 described later, for example) that generates generation information for generating the model pattern from the input shape information by performing supervised learning using a set of learning data pieces each including correction information about the model pattern corrected by using the model pattern correction unit and the input shape information associated with each other. The image processing system is capable of generating a model pattern in which a result of the learning is reflected using the input shape information input to the image processing system and the generation information.

(2) In the image processing system described in (1), the input shape information may be image information resulting from image capture by a visual sensor (visual sensor 11 described later, for example).

(3) In the image processing system described in (1), the input shape information may be CAD data.

(4) In the image processing system described in (1), the input shape information may be three-dimensional point group data.

(5) In the image processing system described in any one of (1) to (4), the correction information may be information about a weight set for an element forming the model pattern, the generation information may be information for setting weight information for the element, and the weight of the element generated from the input shape information may be set based on the generation information.

(6) In the image processing system described in any one of (1) to (4), the correction information may be information designated as a region for the model pattern in the input shape information, the generation information may be information for designating the region for the model pattern in the input shape information, and the region for the model pattern may be designated in the input shape information based on the generation information.

(7) In the image processing system described in any one of (1) to (4), the correction information may be the physical quantity of an element forming the model pattern including a position, a posture, and brightness etc., the generation information may be information for setting the physical quantity of the element, and the physical quantity of the element acquired from the input shape information may be set based on the generation information.

(8) In the image processing system described in any one of (1) to (4), the correction information may be information representing the model pattern itself, the generation information may be information for generating the model pattern from the input shape information, and the model pattern may be generated from the input shape information based on the generation information.

(9) In the image processing system described in any one of (1) to (8), the machine learning unit may acquire the set of learning data pieces from multiple input shape information acquisition units (visual sensors 11, image processing devices 10 described later, for example) that acquire the input shape information to perform supervised learning.

(10) In the image processing system described in (9), the input shape information acquisition units may be image processing devices (image processing devices 10 described later, for example) responsible for image processing, and a learning result obtained from the supervised learning by the machine learning unit may be available to each of the image processing devices.

The image processing system of the present invention is capable of generating an appropriate model pattern automatically for input shape information by learning correction made during generation of a model pattern acquired from different input shape information.

DETAILED DESCRIPTION OF THE INVENTION

Figure 1:
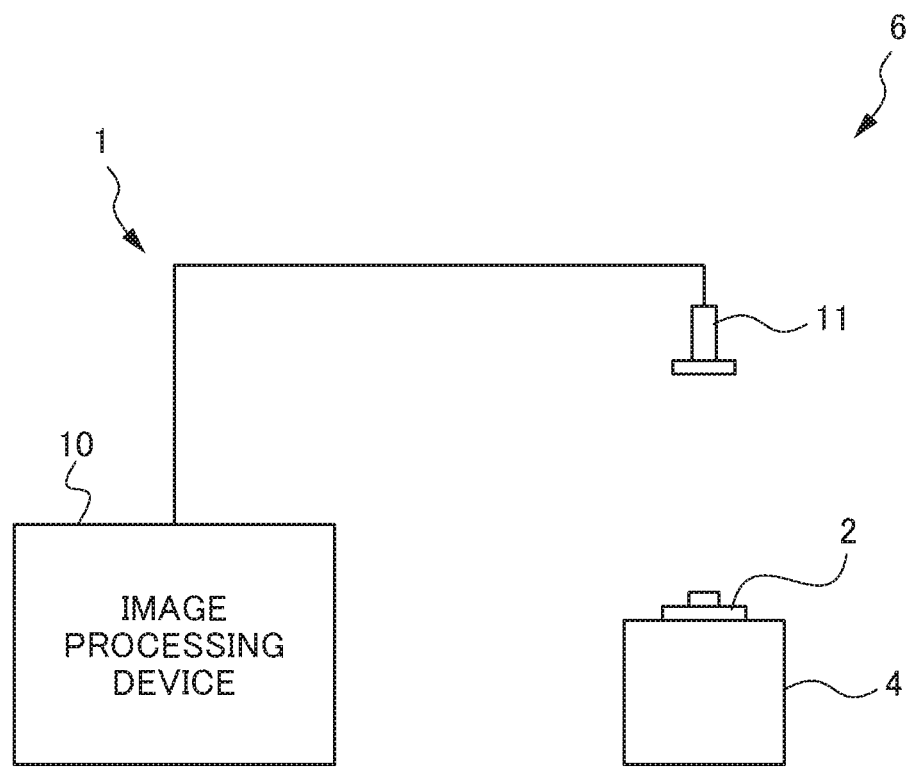
FIG. 1 is a schematic view showing an example of a device using an image processing system of an embodiment and in which the position of a visual sensor is fixed.

A preferred embodiment of the present invention will be described below by referring to the drawings. An image processing system 1 according an embodiment of the present invention is a system for detecting an image of a target 2 in an input image 5 based on a model pattern 50 representing the feature of the image of the target 2. Two exemplary devices using the image processing system 1 of this embodiment will be described first.

FIG. 1 is a schematic view showing an example of a device 6 using the image processing system 1 of this embodiment and in which the position of a visual sensor 11 fixed. As shown in FIG. 1, the target 2 is placed on a work table 4. The visual sensor 11 is a camera for capturing an image of the target 2. The visual sensor 11 is fixed at a position by support means (not shown in the drawings) where the visual sensor 11 can capture an image of the target 2. Image information acquired by the visual sensor 11 is transmitted to an image processing device 10. The image processing device 10 performs image processing described later to detect an image of the target 2 based on the input image 5 (see FIG. 5) received from the visual sensor 11.

Figure 2:
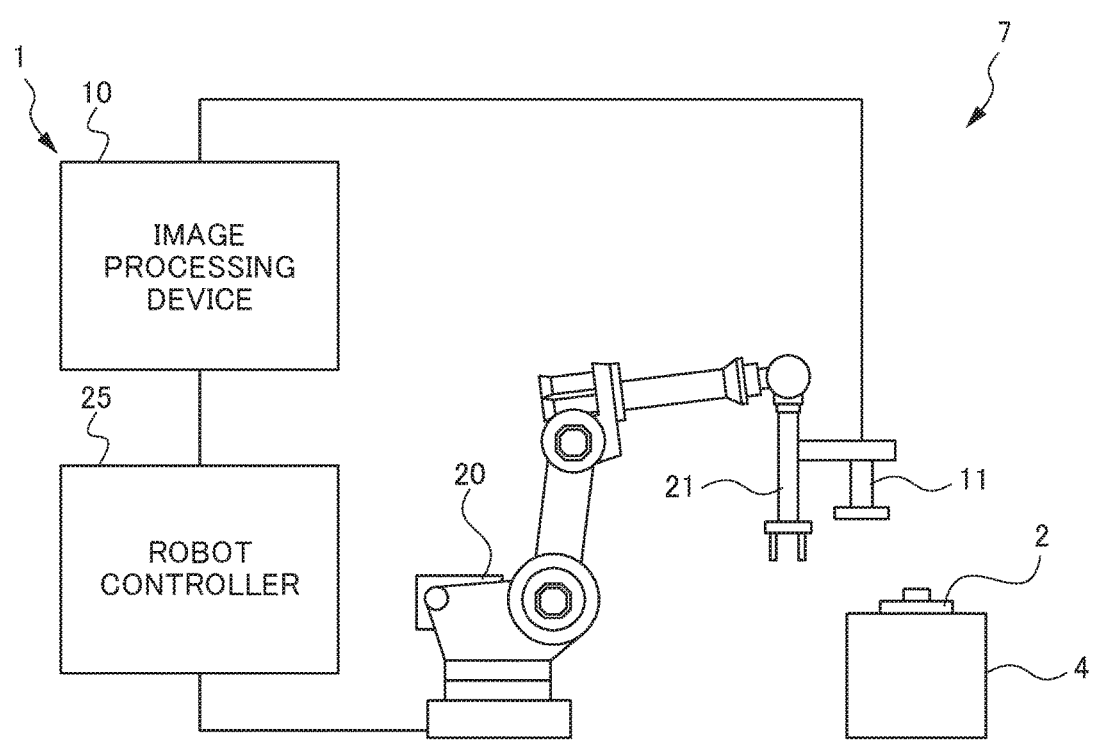
FIG. 2 is a schematic view showing an example of a device using the image processing system of this embodiment and in which the position of the visual sensor is movable.

In FIG. 1, the example in which the position of the visual sensor 11 is fixed was described. In case described next referring to FIG. 2, the position of the visual sensor 11 is movable. FIG. 2 is a schematic view showing an example of a device 7 using the image processing system 1 of this embodiment and in which the position of the visual sensor 11 is movable. A structure common or comparable to a structure in the device 6 described by referring to FIG. 1 may be identified by the same sign and may not be described.

FIG. 2 shows an arm-type robot 20 having an end to which a robot hand 21 is attached. The visual sensor 11 of this example is fixed to the robot hand 21 as a terminal of the robot 20. The robot hand 21 is a movable unit to be moved by the robot 20 or by a mechanism in the robot hand 21. This makes the position of the visual sensor 11 also movable. The image processing device 10 responsible for the image processing is configured to be capable of communicating with a robot controller 25 that controls the motion of the robot 20, etc. to allow exchange of information between the image processing device 10 and the robot 20. The image processing device 10 performs the image processing described later to detect an image of the target 2 based on the input image 5 (see FIG. 5) received from the visual sensor 11 while allowing for the movements or states of the robot 20 and the robot hand 21.

Figure 3:
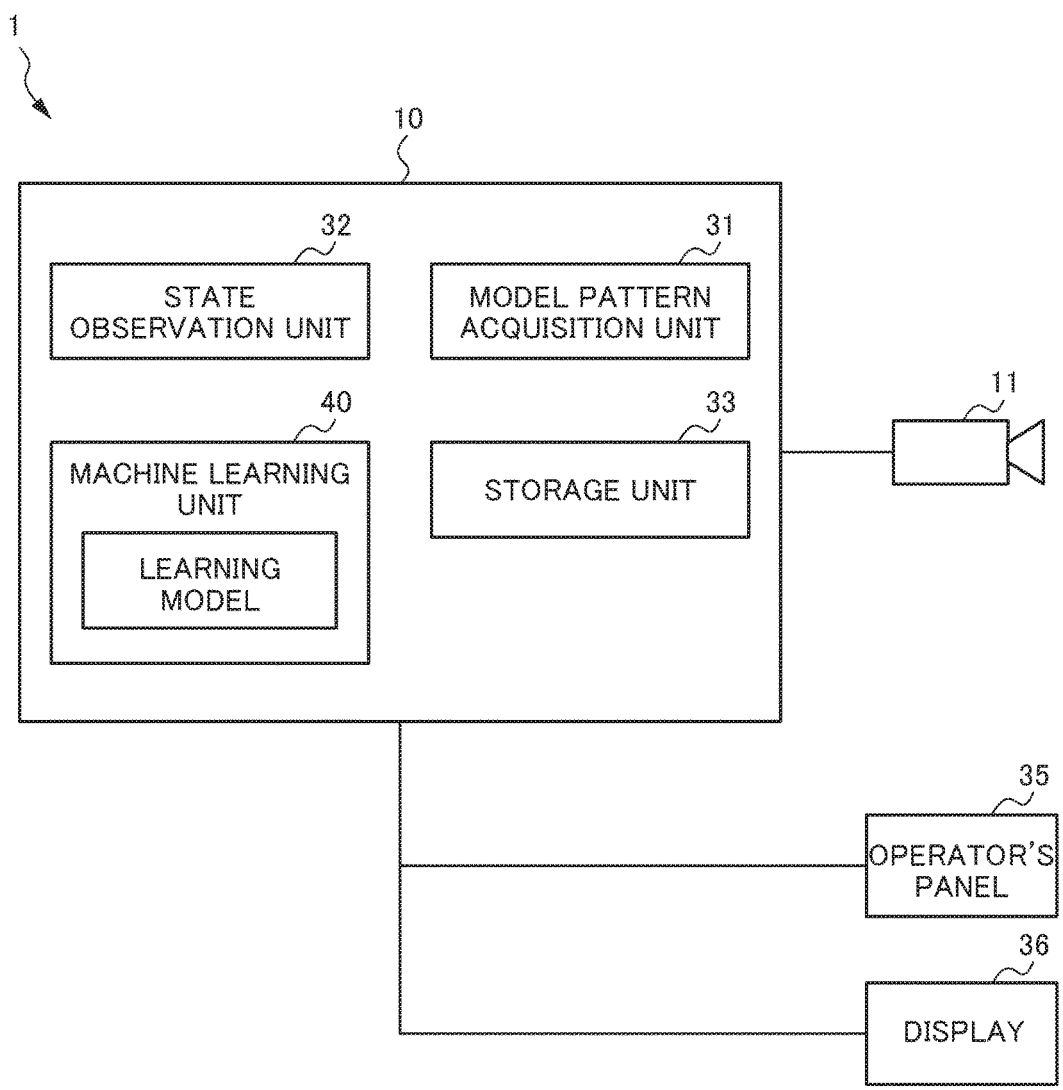
FIG. 3 is a functional block diagram of the image processing system of this embodiment.

As described above, the image processing system 1 of this embodiment is applicable both to the device 6 in which the position of the visual sensor 11 is fixed and the device 7 in which the position of the visual sensor 11 is movable. The image processing by the image processing system 1 will be described next. FIG. 3 is a functional block diagram of the image processing system 1 of this embodiment.

As shown in FIG. 3, the image processing system 1 of this embodiment includes the image processing device 10 as a computer responsible for the image processing, the visual sensor 11 that acquires the input image 5, an operator's panel (operation unit) 35 used by an operator for correction, etc., on the model pattern 50 generated from the input image 5, and a display (output unit) 36 on which image information such as the input image 5 and the model pattern 50 is displayed.

The image processing device 10 is realized by a computer including a CPU, a storage medium storing predetermined software, and others. The image processing device 10 of this embodiment is configured with a model pattern acquisition unit 31, a state observation unit 32, a storage unit 33, and a machine learning unit 40.

The model pattern acquisition unit 31 acquires the model pattern 50 generated from the input image 5 acquired by the visual sensor 11 and correction information about correction on the model pattern 50. The state observation unit 32 acquires the input image 5 as input data. In this embodiment, the correction information to be acquired is operator generated information resulting from correction by an operator.

The storage unit 33 stores various types of information about the image processing device 10. The storage unit 33 of this embodiment stores multiple pieces of group information as learning data including the model pattern 50, and the correction information and the input image 5 associated with each other. In the following description, a set of learning data pieces stored in the storage unit 33 will be called a leaning data set.

The machine learning unit 40 performs machine learning so as to output generation information for generating the model pattern 50 appropriately from the input image 5 based on the learning data set stored in the storage unit 33 to acquire a learning model. The machine learning unit 40 has learned a relationship between input and output in such a manner that output to be taken from the machine learning unit 40 matches generation information as a target of estimation. By doing so, the generation information responsive to the input image 5 can be estimated. In this embodiment, machine learning is performed by following a learning model constructed by a neural network including a multi-layer neural network. Any appropriate system is available for a learning model constructed by a neural network including an input layer, an output layer, and an intermediate layer. For example, a convolutional neural network (CNN) is available.

In this embodiment, the target 2, the visual sensor 11, and the image processing device 10 are defined as environment. Further, correction information resulting from correction on the model pattern 50 by an operator through the operator's panel 35 and the input image 5 as a pair (group) are defined as correct data (teacher data). The correction information is the model pattern 50 as corrected, a model pattern designation region 60 to be designated during generation of the model pattern 50, or a value of correction on the physical quantity of an element (feature point described later) forming the model pattern 50 or the weight of this element, for example. The machine learning unit 40 performs machine learning using the set of learning data pieces to acquire a function for mapping from an input image (input data) to intended data (generation information.).

Figure 4:
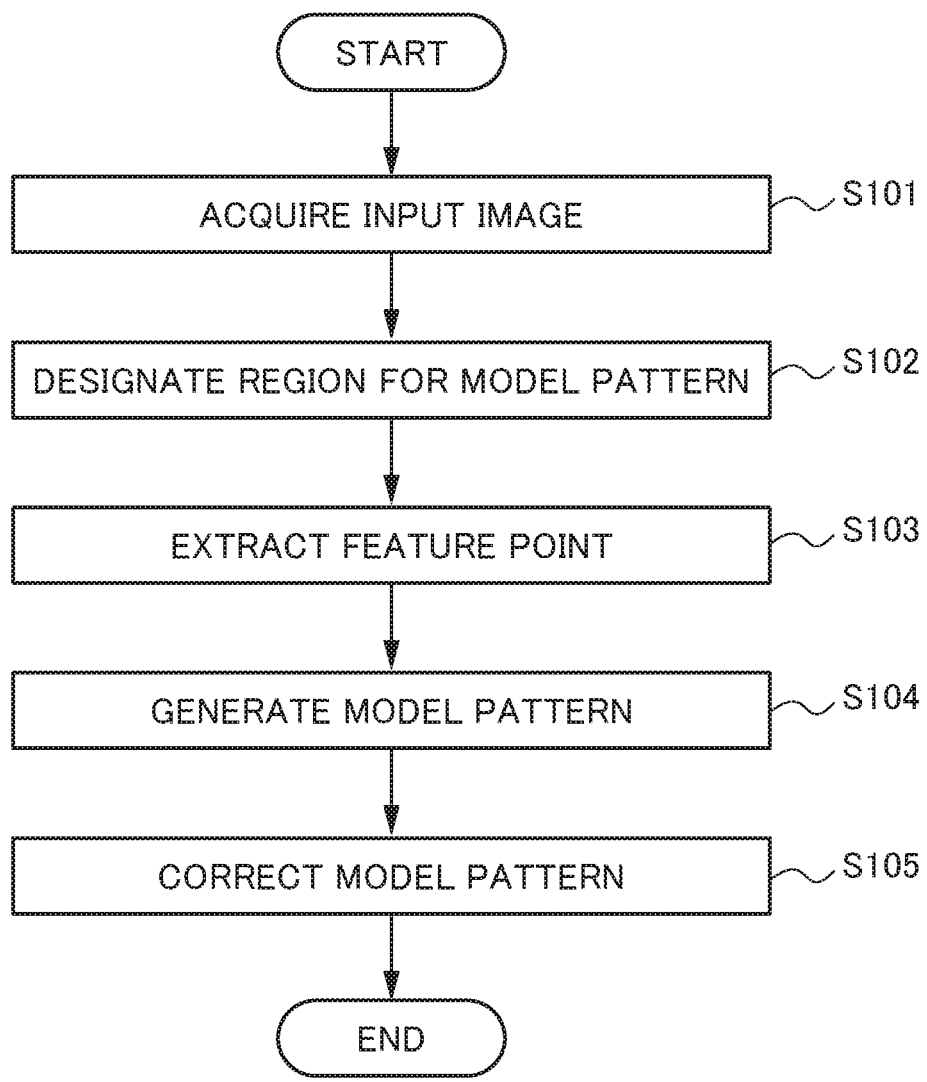
FIG. 4 is a flowchart showing a procedure of generating a model pattern.
Figure 5:
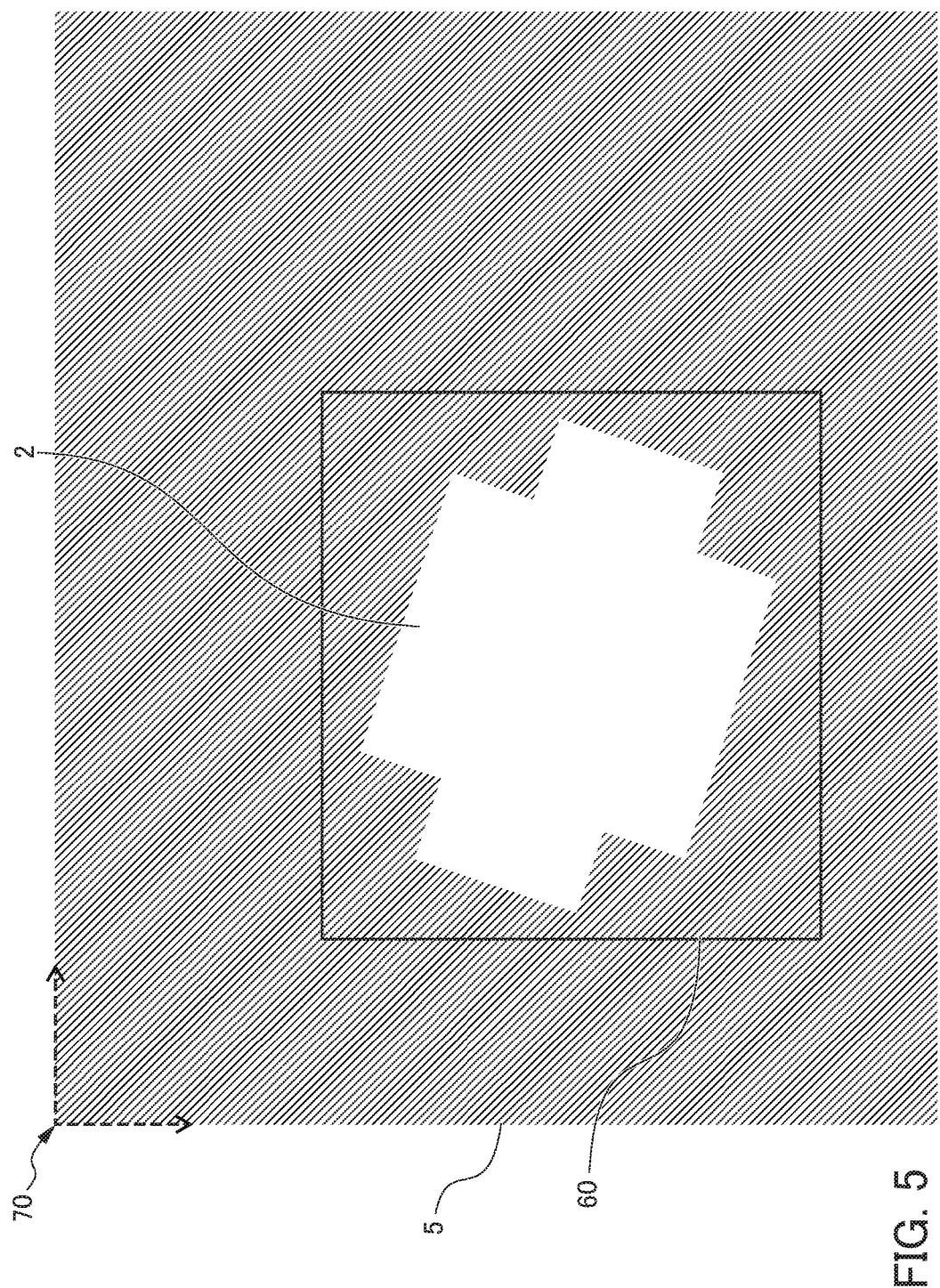
FIG. 5 shows a model pattern designation region designated in an image.
Figure 6:
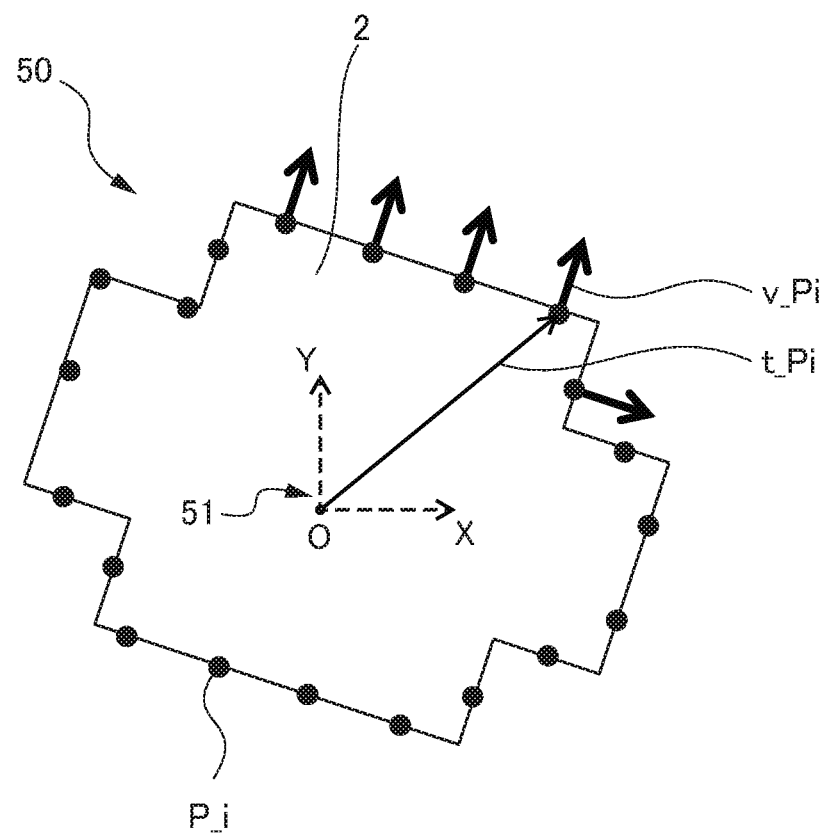
FIG. 6 shows a model pattern including multiple feature points.

An example of generation of the model pattern 50 will be described next. FIG. 4 is a flowchart showing a procedure of generating the model pattern 50. FIG. 5 shows the model pattern designation region 60 designated in an image. FIG. 6 shows the model pattern 50 including multiple feature points P_i.

As shown in FIG. 5, the target 2 intended to be taught as the model pattern 50 is placed within the view of the visual sensor 11 and an image of the target 2 is captured, thereby acquiring the input image 5 including the target 2 (step S101). At this time, the position of the visual sensor 11 and that of the target 2 relative to each other are preferably determined to be the same position of the visual sensor 11 and that of the target 2 at which the target 2 is to be detected during actual use.

A region in the captured image where the target 2 appears is designated as a region for the model pattern 50 (step S102). This region designated in step S102 will be called the model pattern designation region 60. The model pattern designation region 60 of this embodiment is designated as a rectangular region or a circular region so as to surround the target 2. As described later, the model pattern designation region 60 can be stored as correction information (operator generated information) and can be used for machine learning.

Next, a feature point is extracted (step S103). The feature point is to form the model pattern 50. Multiple feature points P_i (i=1 to NP) are extracted from the model pattern designation region 60. The feature point P_i can be extracted by various methods. In this embodiment, an edge point having large brightness gradient in an image and available for acquiring the contour shape of a target is used as the feature point P_i.

The physical quantity of an edge point includes the position of the edge point, and the direction of brightness gradient and the dimension of the brightness gradient at the edge point, etc. Assuming that the direction of the brightness gradient at the edge point is the posture of a feature point, the posture of the feature point can be defined in addition to the position of the feature point. The physical quantity of the edge point, specifically, the position and the posture (direction of brightness gradient) of the edge point, and the dimension of the brightness gradient at the edge point, is stored as the physical quantity of the feature point.

A model pattern coordinate system 51 is defined. Based on the model pattern coordinate system 51 and an origin O, the feature point P_i is expressed in terms of a posture vector v_Pi, a position vector t_Pi, etc. of the feature point P_i. For example, the center of gravity of each feature point P_i forming the model pattern 50 is defined as the origin O in the model pattern coordinate system 51. The origin O can be defined by an appropriate method such as selecting any one point from the feature points P_i. Using the model pattern coordinate system 51 is also an exemplary method. A different method may be employed for expressing the position and the posture of the feature point P_i. Regarding the axis direction of the model pattern coordinate system 51 (posture), any two points may be selected from the feature points P_i forming the model pattern 50, a direction from one of these two points toward the other may be defined as an X-axis direction, and a direction orthogonal to the X-axis direction may be defined as a Y-axis direction, for example. The axis direction can also be defined in such a manner that an image coordinate system and the model pattern coordinate system 51 become parallel to each other in an image used for generating the model pattern 50. In this way, the setting of the model pattern coordinate system 51 and the origin O can be changed appropriately according to the situation. A method itself for extracting an edge point as a feature point is a publicly-known technique described in non-patent document 1, for example, so that this method will not be described in detail.

Next, based on the physical quantity of the extracted feature point P_i, the model pattern 50 is generated (step S104). The physical quantity of the extracted feature point P_i is stored into the storage unit 33 as the feature point P_i forming the model pattern 50. In this embodiment, the model pattern coordinate system 51 is defined within the model pattern designation region 60. The position and the posture of the feature point P_i are stored as values expressed in the model pattern coordinate system 51 (see FIG. 6) based on values expressed in an image coordinate system 70 (see FIG. 5).

If the model pattern 50 is required to be corrected, the model pattern 50 is corrected (step S105). The correction on the model pattern 50 in step S105 is made by an operator. Information resulting from the operation in step S105 is stored as correction information into the storage unit 33. If the model pattern 50 is not corrected, information indicating the absence of correction can also be stored as correction information.

Examples of the correction information stored in step S105 will be described next. In an example described first, an unnecessary feature point P_i is deleted. In the following description, the unnecessary feature point P_i will be called an unnecessary feature point D.

Figure 7:
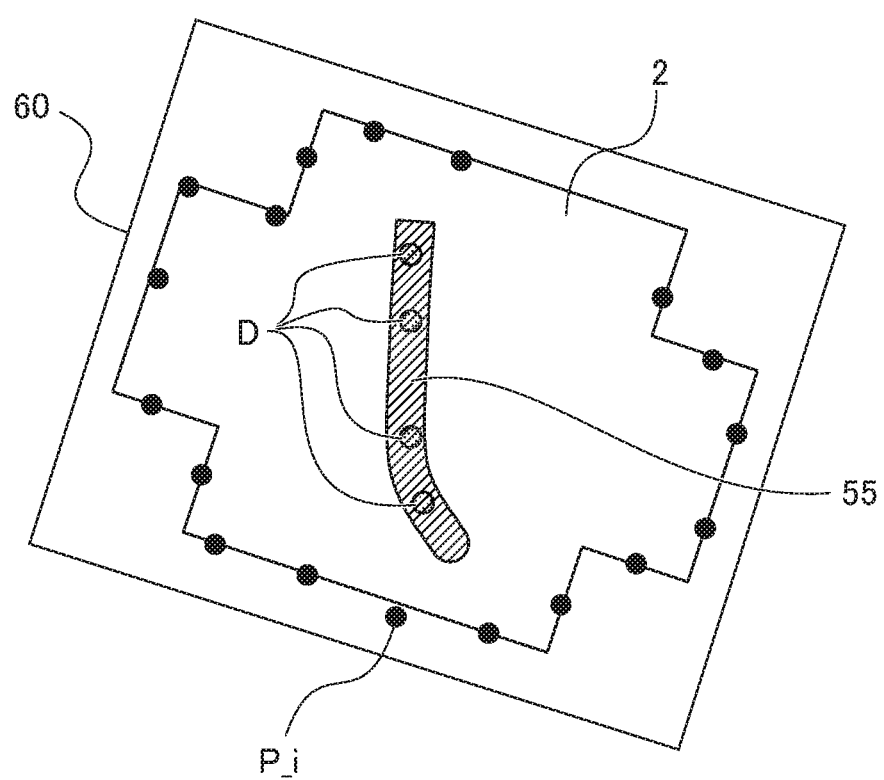
FIG. 7 shows how an unnecessary feature point is deleted in the process of correcting the model pattern.

FIG. 7 shows how the unnecessary feature points D are covered with a mask 55 in the process of correcting the model pattern 50. As shown in FIG. 7, the unnecessary feature points D may be extracted during generation of the model pattern 50. The operator operates the operator's panel 35 to place the mask 55 so as to cover the unnecessary feature points D on an operation screen of the display 36. Then, the feature points D (feature points P_i) in a region covered with the mask 55 are deleted. The model pattern 50 including the multiple feature points P_i from which the feature points D have been deleted is stored as the model pattern 50 as corrected into the storage unit 33. According to this method, a mask image including a region O covered with the mask 55 and a region 1 not covered with the mask 55 can be stored as the correction information (teacher data). The model pattern 50 itself generated by deleting the unnecessary feature points D may be stored as the correction information (teacher data).

Described next is an example where information generated by changing the weights of the multiple feature points P_i forming the model pattern 50 is used as correction information for machine learning. Weight information representing the weight of the feature point P_i is information available for calculating a level of matching between the feature point P_i in the model pattern 50 and a feature point in the input image 5. Referring to FIG. 7, by determining the weight of the feature point D to be zero, this feature point D can be regarded as a deleted feature point, for example. In this way, deleting the unnecessary feature point D from the feature points P_i forming the model pattern 50 can be considered as weighting. By default, the feature point P_i in the model pattern 50 has a weight 1. This weight can be changed by operator's designation of a position to be changed in weight with the mask 55, for example. According to this method, a weighted image including an integral value proportionate to a weight as each pixel value or the model pattern 50 resulting from the weighting can be stored as the correction information.

Figure 8:
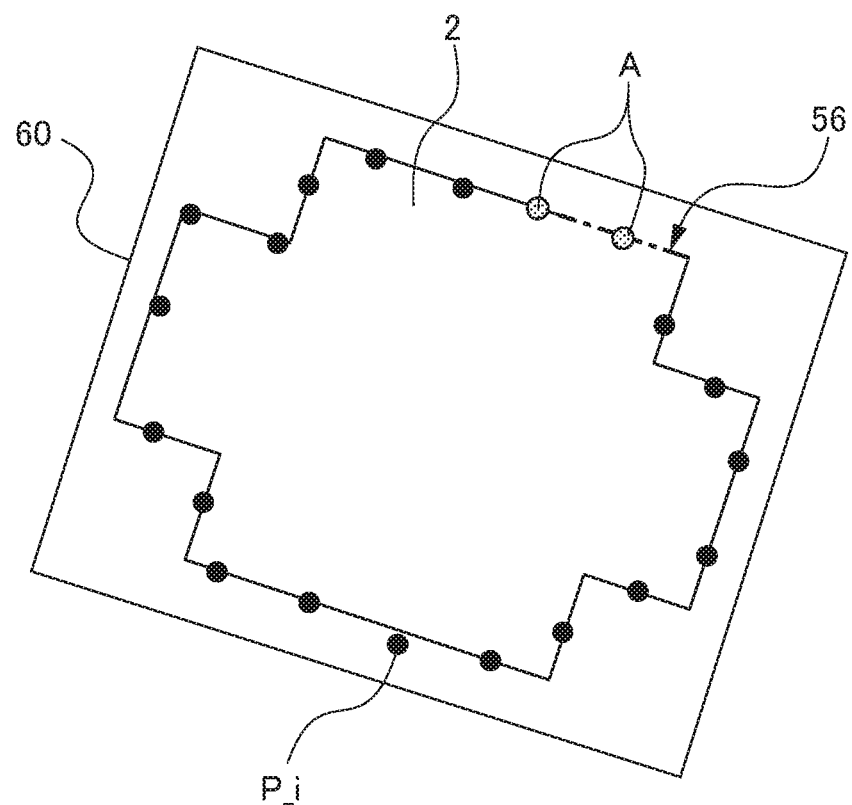
FIG. 8 shows how a feature point is added in the process of correcting the model pattern.

Described next is an example of adding a necessary feature point P_i to the model pattern 50. In the following description, the feature point P_i to be added will be called a feature point A. FIG. 8 shows how the feature points A are added in the process of correcting the model pattern 50. As shown in FIG. 8, in some cases, a feature point P_i to be extracted is not extracted and addition of the feature points A is intended.

The operator places a line segment 56 (see alternate long and short dashed lines of FIG. 8) at a position. where the operator intends to add a feature point P_i on the operation screen. The feature points A are arranged at adequate intervals on the line segment 56. Then, the model pattern 50 including the added feature points A is stored into the storage unit 33. According to this method, the added line segment 56, the added feature points A, the model pattern 50 including the added feature points A, etc. can be stored as the correction information.

Figure 9:
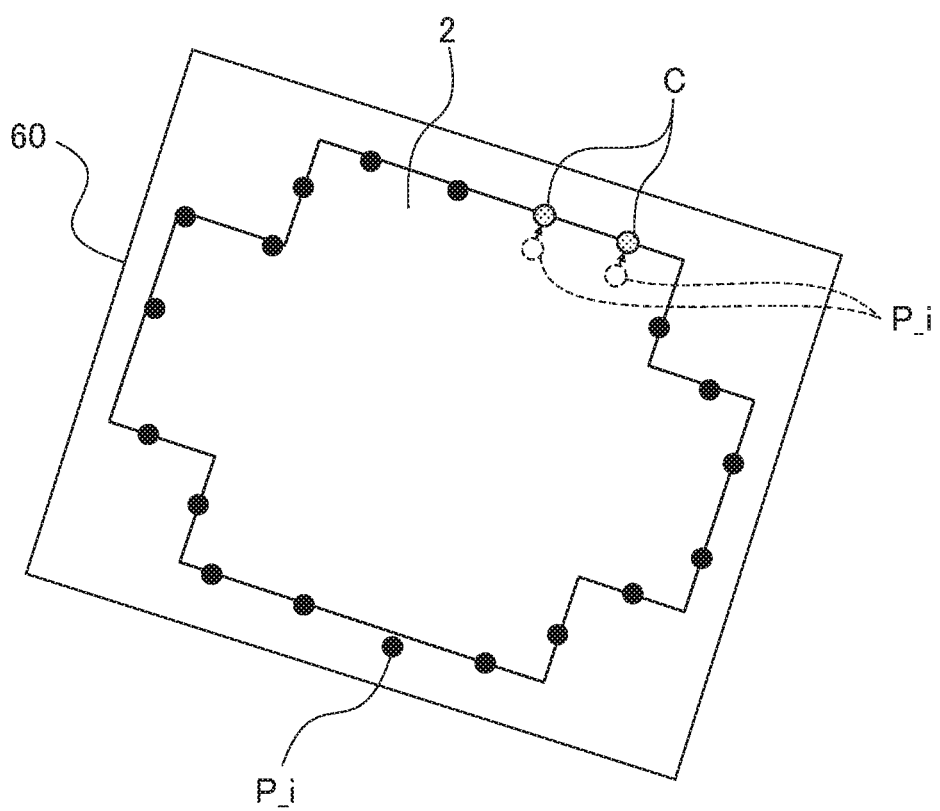
FIG. 9 shows how the physical quantity of a feature point including a position, a posture, and brightness is corrected in the process of correcting the model pattern.

Described next is an example where the feature quantity of the feature point P_i in the model pattern 50 including a position, a posture, and brightness is corrected. FIG. 9 shows how the physical quantity of the feature point P_i including a position, a posture, and brightness is corrected in the process of correcting the model pattern 50. In the following description, the feature point P_i as corrected will be called a corrected feature point C. In FIG. 9, feature points P_i to be corrected are shown by dashed lines.

As shown in FIG. 9, some feature points P_i may be intended to be corrected in terms of position, posture, and brightness. The operator corrects the positions of the feature points P_i on the operation screen. Then, the model pattern 50 generated by replacing the feature points P_i as correction targets by the corrected feature points C is stored as a new model pattern 50 into the storage unit 33. In this case, the corrected feature points C, the model pattern 50 in which the position correction is reflected, etc. may be stored as the correction information.

Figure 10:
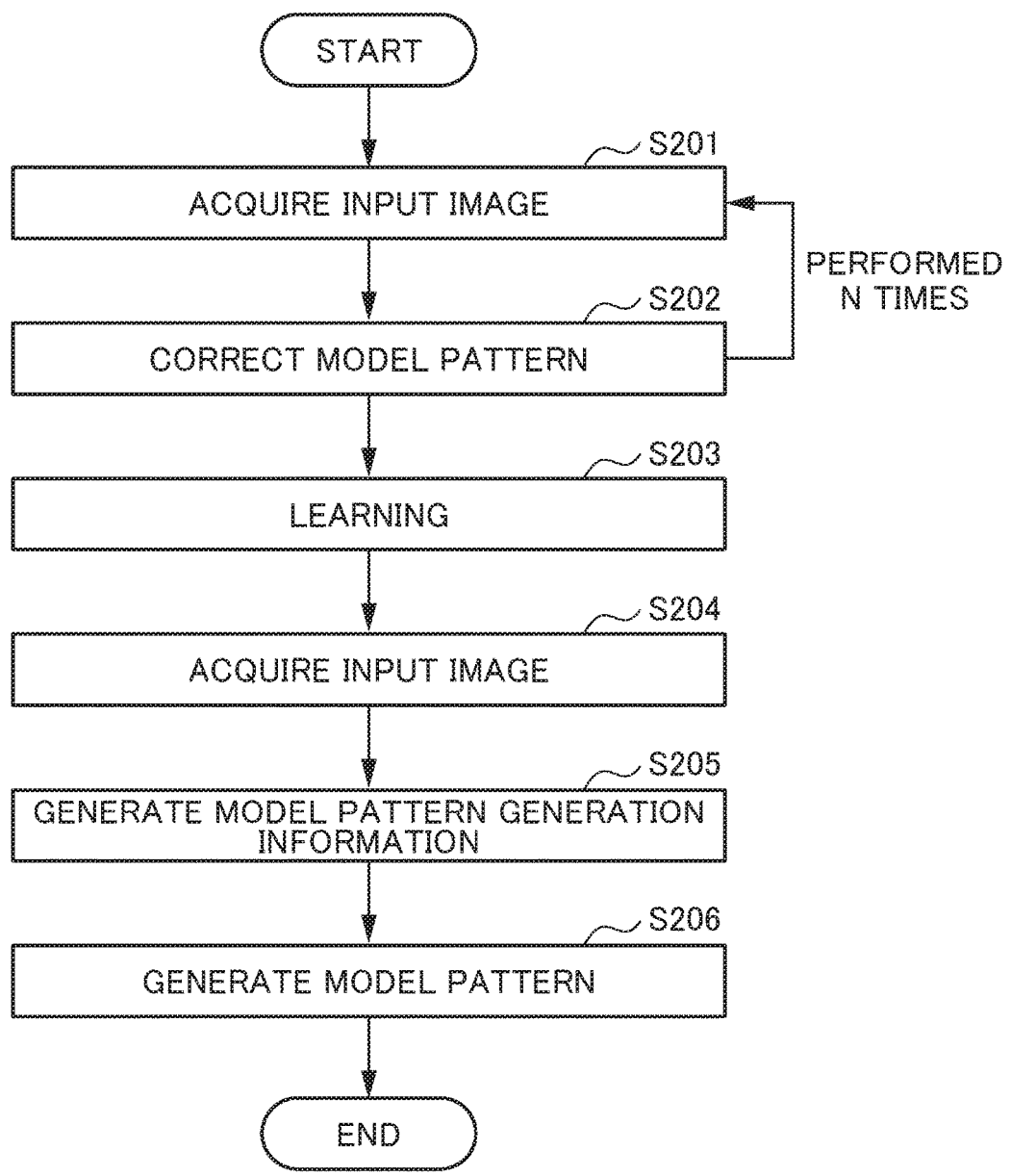
FIG. 10 is a flowchart showing a procedure of learning the model pattern.

The examples of the correction information stored as the learning data into the storage unit 33 are as described above. The following describes machine learning process performed by the image processing device 10 of this embodiment. FIG. 10 is a flowchart showing a procedure of learning the model pattern 50.

The input image 5 is acquired (step S201). The input image 5 acquired in this step may be a partial image within the model pattern designation region 60. The acquired input image 5 is stored into the storage unit 33.

The model pattern 50 is taught. If necessary, the model pattern 50 is corrected (step S202). As a result of the processes in step S201 and step S202, one pair (group) including the input image 5 as input data and correction information as correct data can be acquired. The acquired pieces of information are stored. The processes in step S201 and step S202 are repeated N times for acquiring N pairs each being learning data. As a result of implementation of the processes in step S201 and step S202 N times, multiple (N) learning data pieces are acquired. A set of these N learning data pieces will be used as a learning data set.

Learning is performed using the learning data set as a set of the N learning data pieces (step S203). The input image 5 is acquired for generation of the model pattern 50 (step S204). A new input image is input to the machine learning unit 40 and model pattern generation information is generated (step S205). The model pattern 50 in which a result of the learning is reflected is generated based on the input image 5 and the model pattern generation information (S206).

The following describes an example of the process in step S203. In this example, correction process by an operator using the mask 55 is learned as correction information. The learning process is performed by taking the following procedure.

(1) One learning data piece is taken from the acquired set of the N learning data pieces.
(2) Next, an image in the model pattern designation region 60 in the correction information is cut out from the input image 5 in the learning data.
(3) Each pixel value in the input image 5 is input to a learning model to generate an image of the mask 55.
(4) An error between a mask image in the correction information (learning data) and the generated image of the mask 55 is calculated.
(5) The error is backpropagated by the error backpropagation method using the learning model to update a parameter for the learning model.

In the processes (1) to (5), the machine learning unit 40 performs machine learning using teacher data including an input image as input data and an image of the mask 55 as edited as a label.

Described next is how the model pattern 50 is generated using the learning model resulting from learning of the correction process using the mask 55. This process corresponds to the processes in step S204 and step S205 and is performed by taking the following procedure.

(1) The operator designates the model pattern designation region 60 in the input image 5.
(2) A partial image is cut out from the model pattern designation region 60.
(3) The model pattern 50 is generated from the partial image by following the normal process.
(4) The partial image (input image) is input to the learning model to acquire an image of the mask 55 (generation information) appropriate for the partial image.
(5) The mask image is applied to the generated model pattern 50 to delete the feature point D in a range covered with the mask 55.

As a result of the processes (1) to (5), if the input image 5 is input to the machine learning unit 40 after the machine learning unit 40 performs learning, an image of the mask 55 in which a result of the learning is reflected is output automatically. In this way, the unnecessary feature point D in the range covered with the mask 55 is deleted automatically. As a result, the learning result is reflected in the model pattern 50 finally generated.

Figure 11:
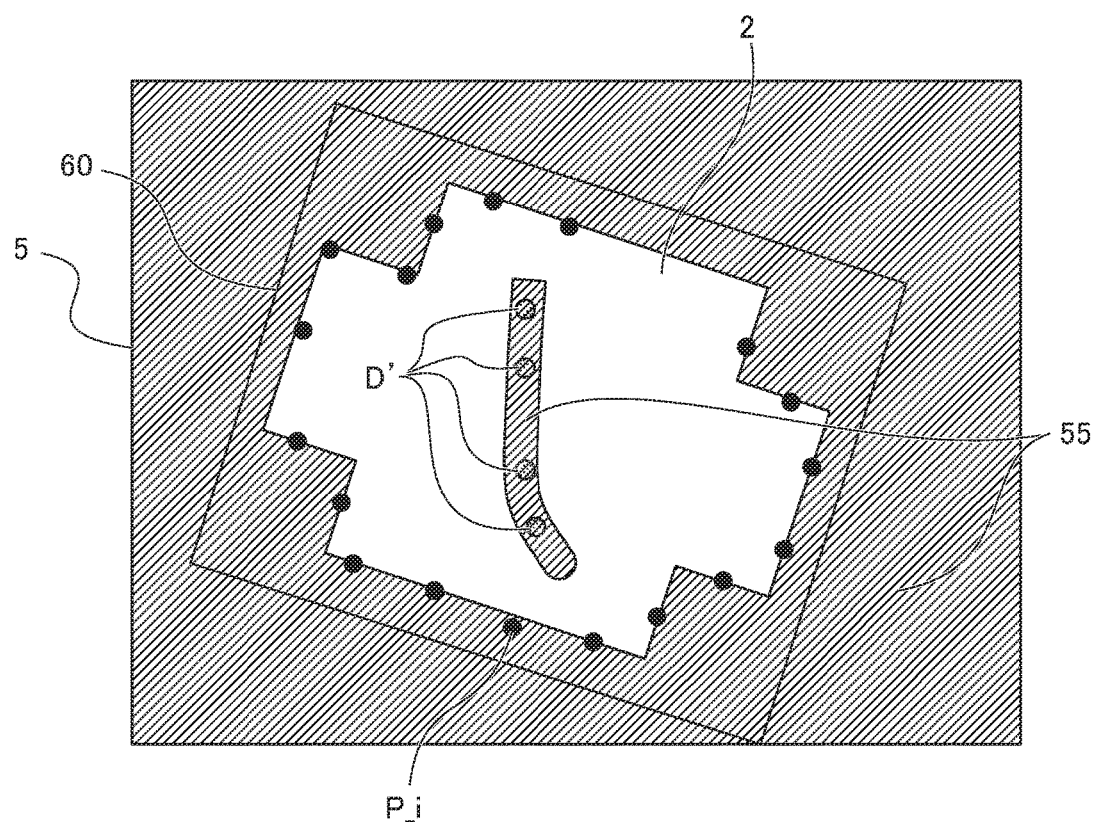
FIG. 11 shows how an unnecessary feature point is deleted by covering an entire image with a mask.

FIG. 11 shows how unnecessary feature points D' are deleted by covering an entire image with the mask 55. As shown in FIG. 11, the process of cutting out a partial image may be omitted and the input image 5 may be used entirely. This method may be implemented by processing the input image 5 entirely so as to cover a region other than the model pattern designation region 60 with the mask 55. This process is performed by taking the following procedure.

(1) The input image 5 is input to a learning model to acquire a mask image.
(2) The model pattern 50 is generated from the input image 5 by following the normal process.
(3) An image of the mask 55 is applied to the generated model pattern 50 to delete the feature points D' covered with the mask 55.

The unnecessary feature points D' are also deleted automatically as a result of the processes (1) to (3). Thus, a learning result is reflected in the model pattern 50 finally generated.

The foregoing embodiment achieves the following effects. The image processing system 1 includes: the model pattern acquisition unit 31 that acquires the model pattern 50 generated from the input image 5; the operator's panel (model pattern correction unit) 35 used for correcting the model pattern 50 acquired by the model pattern acquisition unit 31; and the machine learning unit 40 that generates model pattern generation information for generating the model pattern 50 from the input image 5 by performing supervised learning using a set of learning data pieces each including correction information about the model pattern 50 corrected by using the operator's panel 35 and the input image 5 associated with each other. The image processing system 1 is capable of generating a model pattern in which a result of the learning is reflected using the input image 5 newly input and the model pattern generation information. As a result, process of operation performed by an operator for acquiring the model patterns 50 appropriate for various input images 50 is learned. Thus, the appropriate model pattern 50 in which a learning result is reflected can be acquired even for an unknown image without operation by the operator.

In this embodiment, the input image 5 is image information resulting from image capture by the visual sensor 11. Thus, an actual input image captured by the visual sensor 11 is used, so that a learning model to be acquired can be more responsive to actual operation.

In this embodiment, the correction information may be information about a weight set for the feature point (element) $P\_i$ forming the model pattern 50. The model pattern generation information may be information for setting weight information for the feature point $P\_i$ forming the model pattern 50. In this case, the weight of the feature point $P\_i$ forming the model pattern 50 generated from the input image 5 is set based on the generation information. Thus, the multiple feature points $P\_i$ are learned to determine which feature point $P\_i$ is important or unnecessary. As a result, even by the use of a different image not having been used for learning, the model pattern 50 from which the unnecessary feature point D is deleted can still be acquired without operation by the operator.

In this embodiment, the correction information may be information designated as a region for the model pattern 50 in the input image 5. The model pattern generation information may be information for designating the region for the model pattern 50 in the input image 5. In this case, the region for the model pattern is designated in the input image 5 based on the model pattern generation information. As a result, the dimension of a range in the input image 5 used for extracting the model pattern 50 is learned, so that the model pattern designation region 60 used for extracting the model pattern 50 is designated automatically without operation by the operator. In this way, the feature point P_i in an appropriate range is extracted to allow generation of the appropriate model pattern 50.

In this embodiment, the correction information may be the physical quantity of the feature point P_i forming the model pattern 50 including a position, a posture, and brightness etc. The model pattern generation information may be information for setting the physical quantity of the feature point P_i forming the model pattern 50. In this case, the physical quantity of the feature point P_i forming the model pattern 50 acquired from the input image 5 is set based on the model pattern generation information. As a result, correction on the physical quantity of the feature point P_i including a position, a posture, and brightness etc. made by the operator is learned. If machine learning is performed using a graphic object edited for adding the feature point A as teacher data and if a new input image 5 is input to the machine learning unit 40, the model pattern 50 is output as an appropriate graphic object in which addition of the feature point A to a necessary position is reflected.

In this embodiment, the correction information may be information representing the model pattern 50 itself. The model pattern generation information may be information (a function or an algorithm, for example) for generating the model pattern 50 from the input image 5. In this case, the final model pattern 50 is generated from the input image 5 based on the model pattern generation information. As a result, the machine learning unit 40 performs learning using the input image 5 as an input and using the model pattern 50 finally generated by the operator as teacher data. By doing so, in response to input of the input image 5 to the machine learning unit 40, the appropriate model pattern 50 can be generated automatically without operation by the operator.

In the example of the foregoing embodiment, an edge point is used as a feature point forming the model pattern 50. However, this is not the only configuration. The following describes methods for generating the model pattern 50 different from the method of the foregoing embodiment.

Described first is a method of extracting a feature point other than the method using an edge point. The feature point can be detected by various methods other than the method using an edge point. For example, a feature point such as a scale-invariant feature transform (SIFT) feature point is available. A method itself for extracting the SIFT feature point from an image is a publicly-known technique described in non-patent document 2, so that this method will not be described in detail.

The model pattern 50 may be generated by locating a geometric graphic object such as a line segment, a rectangle, or a circle so as to match the contour of the target 2 appearing in an image. In this case, the model pattern 50 may be generated by locating feature points at adequate intervals along the geometric graphic object forming the contour. An image including pixels may be used as a model pattern.

In the foregoing embodiment, an image detected by the visual sensor (camera) 11 is used as the input image 5. Alternatively, the input image 5 may be an image acquired by different means. For example, CAD data is available as the input image 5. If two-dimensional CAD data is used, a model pattern can be generated by the same method as the foregoing method using a geometric graphic object. If three-dimensional CAD data is used, a model pattern may be generated by projecting the shape of the target 2 expressed as CAD data on an image and extracting a feature point from the projected image.

The following describes generation of the model pattern 50 using CAD data.

(1) A local coordinate system is defined in which an origin O is set in an image (image capture surface) captured by the visual sensor (camera) 11.

(2) By calibrating the visual sensor (camera) 11 in advance, a three-dimensional point expressed in the local coordinate system can be converted to a two-dimensional point in the captured image.

(3) The target 2 expressed as CAD data is located virtually in the local coordinate system. The located CAD data is expressed in the local coordinate system. A correlation between the visual sensor (camera) 11 and the target 2 is set to be substantially the same as a correlation therebetween for actually detecting a target.

(4) A group of three-dimensional points on a contour located at predetermined intervals is acquired from the contour. If necessary, a contour in the CAD data to be used as a model pattern is designated.

(5) The three-dimensional point group is projected on the image captured by the visual sensor (camera) 11 to acquire a two-dimensional point group in an image coordinate system. The direction of brightness gradient can be added by designating a light-dark direction in the CAD data. The light-dark direction mentioned herein indicates which of the two regions separated by the contour as a boundary is a lighter region.

(6) The acquired two-dimensional point group in the image coordinate system is converted so as to be expressed in a model coordinate system, and the resultant two-dimensional point group is stored as a feature point into the storage unit 33.

As described above, the input image 5 may be image information generated based on the CAD data. In this way, various systems are applicable to the input image 5. For example, a range image or three-dimensional point group data is available as the input image 5.

In the example of the foregoing embodiment, the image processing system 1 is configured using the image processing device 10 to which the single visual sensor 11 is connected. However, this is not the only configuration. An image processing system having a different configuration from the foregoing embodiment will be described next. In the example described below, a structure comparable to a structure of the foregoing embodiment will be identified by the same sign and will not be described in detail.

Figure 12:
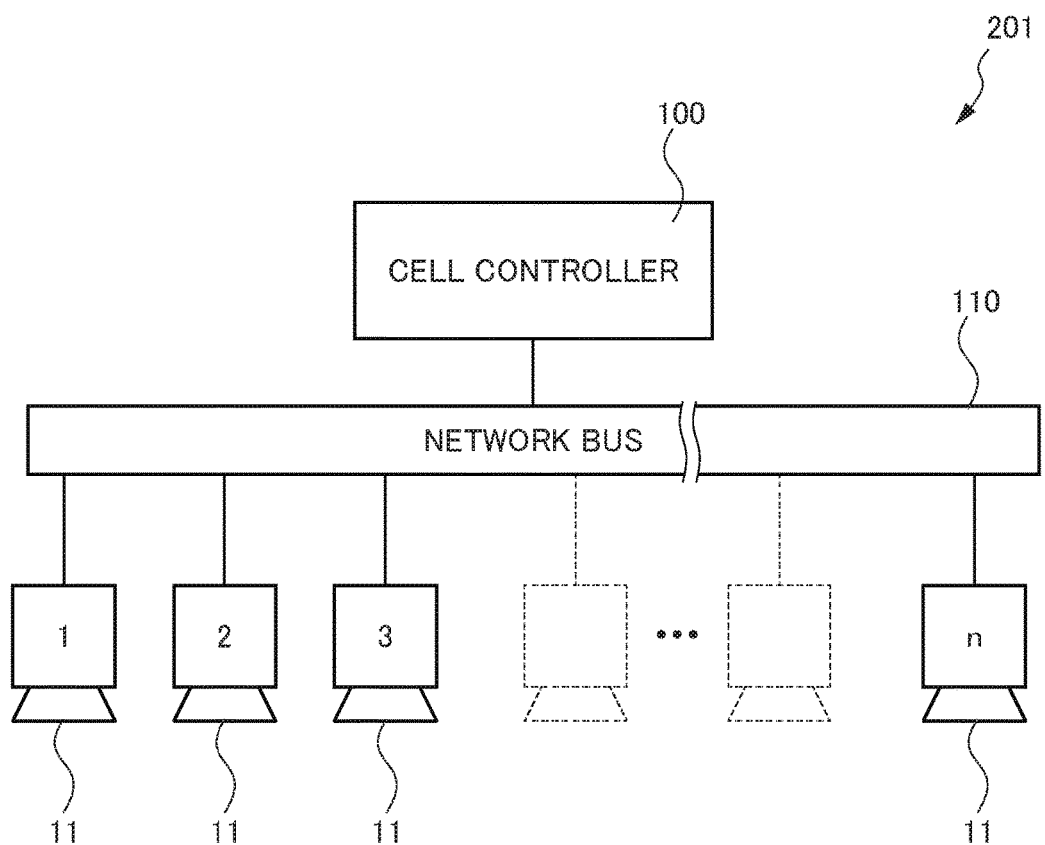
FIG. 12 schematically shows an example of an image processing system according to an embodiment of the present invention to which multiple visual sensors are connected.

FIG. 12 schematically shows an example of an image processing system 201 according to an embodiment of the present invention to which multiple visual sensors 11 are connected. As shown in FIG. 12, N visual sensors 11 as input image acquisition units are connected to a cell controller 100 through a network bus 110. The cell controller 100 has a function comparable to that of the foregoing image processing device 10. The cell controller 100 acquires an input image 5 received from each of the N visual sensors 11. While not shown in FIG. 12, one or multiple operation units are connected to the network bus 110 and the model pattern 50 can be corrected through the operation unit. Correction information generated by operation through the operation unit forms a group together with a corresponding input image 5, and this group is stored as learning data into the cell controller 100.

As described above, in the image processing system 201 shown in FIG. 12, the machine learning unit 40 acquires a set of learning data pieces stored in the cell controller 100 to perform supervised learning. In this example, learning processes can sequentially be performed on line.

Figure 13:
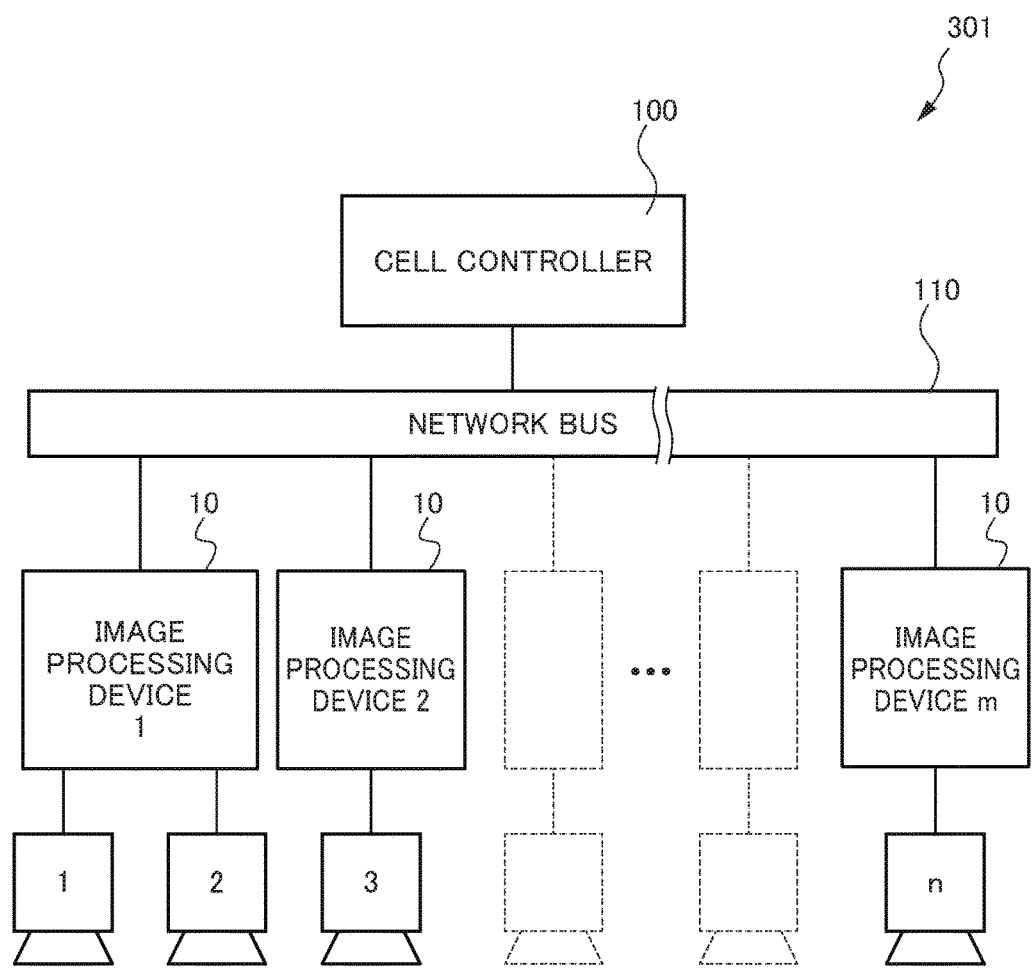
FIG. 13 schematically shows an example of an image processing system according to an embodiment of the present invention to which multiple image processing devices are connected.

FIG. 13 schematically shows an example of an image processing system 301 according to an embodiment of the present invention to which multiple image processing devices 10 are connected. As shown in FIG. 13, m image processing devices 10 as input image acquisition units are connected to the cell controller 100 through the network bus 110. One or multiple visual sensors 11 are connected to each of the image processing devices 10. The image processing system 301 as a whole includes n visual sensors 11 in total.

As described above, in the example in FIG. 13, correction information acquired by each of the image processing devices 10 is transmitted together with the input image 5 to the cell controller 100 automatically or by hand. The cell controller 100 stores a set of learning data pieces as a learning data set transmitted from the multiple image processing devices 10. Then, the cell controller 100 performs machine learning to construct a learning model. The learning model is available by each of the image processing devices 10.

The image processing system 301 shown in FIG. 13 includes the multiple image processing devices 10 as the input image acquisition units. Learning results acquired by supervised learning by the machine learning units 40 are mutually available between all the image processing devices 10. Also in this example, learning processes can sequentially be performed on line.

It should be noted that the present invention is not limited to the foregoing preferred embodiment of the preset invention but can be changed, where appropriate.

For example, operation itself performed by an operator for correction on the model pattern 50 may be stored as correction information. In this case, the machine learning unit 40 learns a series of operations performed for editing the model pattern 50 as teacher data. If the input image 5 is input to the machine learning unit 40 after the machine learning unit 40 performs the learning, the series of the operations for editing the model pattern 50 is output.

In the example of the foregoing embodiment, a set of feature points forms a model pattern. Alternatively, a model pattern may be a partial image cut out from an input image or a combination of graphic objects such as line segments, for example. Various methods capable of generating a model pattern from input shape information are applicable. A model pattern may be generated by any appropriate method.

In the example of the foregoing embodiment, the model pattern correction unit is realized by correction by an operator through the operator's panel 35. However, this is not the only configuration. Machine learning may be performed using correction information resulting from correction process performed automatically as a result of matching. In this case, software or a device responsible for the correction process corresponds to the model pattern correction unit.

In the example of the foregoing embodiment, the input image 5 is mainly used as input shape information. Alternatively, the input shape image may be CAD data or three-dimensional point group data. Specifically, the input shape information is not always required to be an image itself. As long as the input shape information represents a shape, the present invention is applicable to a case where the input shape information is not given through an image.

In the foregoing embodiment, each of the image processing systems 1, 201, and 301 is described distinctively from the image processing device 10 for the convenience of description. However, the image processing systems 1, 201, and 301, and the image processing device 10 are not to be interpreted in a sense limited by their names. A single image processing device satisfying the requirements of the present invention also corresponds to an image processing system.

EXPLANATION OF REFERENCE NUMERALS

1, 201, 301 Image processing system
5 Input image (input shape information)
10 Image processing device (input image acquisition unit)
11 Visual sensor (input image acquisition unit)
31 Model pattern acquisition unit
35 Operator's panel (model pattern correction unit)
40 Machine learning unit
50 Model pattern

What is claimed is:

1. An image processing system that detects an image of a target in input shape information based on a model pattern representing the feature of the image of the target, comprising:
   a model pattern acquisition unit that acquires the model pattern generated from the input shape information;
   a model pattern correction unit used for correcting the model pattern acquired by the model pattern acquisition unit; and
   a machine learning unit that generates generation information for generating the model pattern from the input shape information by performing supervised learning using a set of learning data pieces each including correction information about the model pattern corrected by using the model pattern correction unit and the input shape information associated with each other, wherein
   the image processing system is capable of generating a model pattern in which a result of the learning is reflected using the input shape information input to the image processing system and the generation information.

2. The image processing system according to claim 1, wherein the input shape information is image information resulting from image capture by a visual sensor.

3. The image processing system according to claim 1, wherein the input shape information is CAD data.

4. The image processing system according to claim 1, wherein the input shape information is three-dimensional point group data.

5. The image processing system according to claim 1, wherein the correction information is information about a weight set for an element forming the model pattern,
   the generation information is information for setting weight information for the element, and
   the weight of the element generated from the input shape information is set based on the generation information.

6. The image processing system according to claim 1, wherein the correction information is information designated as a region for the model pattern in the input shape information,
> the generation information is information for designating the region for the model pattern in the input shape information, and
> the region for the model pattern is designated in the input shape information based on the generation information.

7. The image processing system according to claim 1, wherein the correction information is the physical quantity of an element forming the model pattern including a position, a posture, and brightness,
> the generation information is information for setting the physical quantity of the element, and
> the physical quantity of the element acquired from the input shape information is set based on the generation information.

8. The image processing system according to claim 1, wherein the correction information is information representing the model pattern itself,
> the generation information is information for generating the model pattern from the input shape information, and
> the model pattern is generated from the input shape information based on the generation information.

9. The image processing system according to claim 1, wherein the machine learning unit acquires the set of learning data pieces from multiple input shape information acquisition units that acquire the input shape information to perform supervised learning.

10. The image processing system according to claim 9, wherein the input shape information acquisition units are image processing devices responsible for image processing, and
> a learning result obtained from the supervised learning by the machine learning unit is available by each of the image processing devices.

* * * * *